(12) United States Patent
Nicolau et al.

(10) Patent No.: US 10,713,641 B1
(45) Date of Patent: Jul. 14, 2020

(54) SYSTEM AND METHOD FOR IMPLEMENTING A DIGITAL TIPPING APPLICATION ON A MOBILE DEVICE

(71) Applicant: JPMorgan Chase Bank, N.A., New York, NY (US)

(72) Inventors: Lionel Nicolau, Philadelphia, PA (US); Ajinkya P. Joglekar, Philadelphia, PA (US); Manning R. Field, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 491 days.

(21) Appl. No.: 14/850,073

(22) Filed: Sep. 10, 2015

(51) Int. Cl.
*G06Q 20/32* (2012.01)
*H04W 4/021* (2018.01)

(52) U.S. Cl.
CPC ........ *G06Q 20/3224* (2013.01); *H04W 4/021* (2013.01)

(58) Field of Classification Search
CPC ...... G06Q 20/40; G06Q 20/20; G06Q 20/327; G06Q 20/38; G06Q 20/08
USPC .......................................................... 705/39
See application file for complete search history.

(56) References Cited

U.S. PATENT DOCUMENTS

| | | | | |
|---|---|---|---|---|
| 8,985,442 B1* | 3/2015 | Zhou | ...................... | G06Q 20/30 235/375 |
| 2010/0280960 A1* | 11/2010 | Ziotopoulos | ......... | G06Q 20/202 705/80 |
| 2013/0091058 A1* | 4/2013 | Huster | ................. | G06Q 20/322 705/44 |
| 2014/0304187 A1 | 10/2014 | Menn | | |
| 2015/0046320 A1* | 2/2015 | Baldwin | ................ | G06Q 50/12 705/40 |
| 2015/0120509 A1* | 4/2015 | Moring | .............. | G06Q 30/0633 705/26.81 |
| 2015/0149357 A1 | 5/2015 | Ioannidis et al. | | |
| 2015/0170133 A1* | 6/2015 | Love | .................. | G06Q 20/3224 705/44 |

(Continued)

FOREIGN PATENT DOCUMENTS

WO   WO-2013184990 A1 * 12/2013   ............ H04W 4/023

OTHER PUBLICATIONS

Sandro Rodriguez Garzon; "Geofencing 2.0: Taking Location-based Notifications to the Next Level"; UbiComp; Sep. 2014; pp. 921-932 (Year: 2014).*

*Primary Examiner* — Abhishek Vyas
*Assistant Examiner* — Dario Bianco
(74) *Attorney, Agent, or Firm* — Hunton Andrews Kurth LLP

(57) ABSTRACT

The invention relates to a mobile device that enables a user to send a digital tip to a recipient as a standalone transaction, the mobile device comprising: a memory that stores data associated with an account and a user; a microprocessor, executing a mobile application, the processor coupled to memory and programmed to: identify whether the mobile device is near a service provider based on a geofence (or other boundary); display a prompt on the mobile device to send a tip to a mobile device of the service provider in response to the mobile device's proximity to the service provider and a prior service interaction which is independent of an underlying transaction; transmit a tip message informing the service provider of the tip and debit an amount of the tip from an account associated with a consumer.

18 Claims, 12 Drawing Sheets

(56) References Cited

U.S. PATENT DOCUMENTS

| | | | |
|---|---|---|---|
| 2015/0262208 A1* | 9/2015 | Bjontegard | G06Q 30/0205 705/7.31 |
| 2016/0117665 A1* | 4/2016 | Davis | G06Q 20/223 705/39 |

* cited by examiner

SYSTEM AND METHOD FOR IMPLEMENTING A DIGITAL TIPPING APPLICATION ON A MOBILE DEVICE

FIELD OF THE INVENTION

The invention relates generally to a system and method for implementing a digital tipping application, and more particularly to a system and method for providing a digital tip to a service provider as a separate transaction.

BACKGROUND

Today, people largely tip service industry workers in cash. While cash can be a quick form of payment in this scenario, consumers may not always be carrying cash, especially small bills, for tipping. In addition, with the marketplace moving towards digital wallets, consumers are increasingly relying on mobile phones as the primary or preferred form of payment. As a result, customers do not have an easy way to provide electronic tips to a service worker as an stand-alone transaction.

These and other drawbacks currently exist.

SUMMARY

According to one embodiment, the invention relates to a computer-implemented system and method for implementing a tipping application as a standalone transaction. The system may include a mobile device comprising: a memory that stores data associated with an account and a user; a microprocessor, executing a mobile application, the processor coupled to memory and programmed to: identify whether the mobile device is near a service provider based on a geofence; display a prompt on the mobile device to send a tip to a mobile device of the service provider in response to the mobile device's proximity to the service provider and a prior service interaction which is independent of an underlying transaction; identify a tip amount for the tip; transmit a tip message informing the service provider of the tip; and debit the tip amount from an account associated with the user.

The invention also relates to a method that may be conducted on a specially programmed computer system comprising one or more computer processors, mobile devices, electronic storage devices, and networks.

The invention also relates to a computer readable medium containing program instructions for executing a method for implementing a tipping application on a mobile device as a standalone transaction, comprising the steps of: identify whether the mobile device is near a service provider based on a geofence; display a prompt on the mobile device to send a tip to a mobile device of the service provider in response to the mobile device's proximity to the service provider and a prior service interaction which is independent of an underlying transaction; identify a tip amount for the tip; transmit a tip message informing the service provider of the tip; and debit the tip amount from an account associated with the user.

The computer implemented system, method and medium described herein can provide the advantage of helping account holders facilitate tipping for service providers without an underlying transaction, according to various embodiments of the invention. The system provides a convenient and easy way to provide tips to service providers when customers do not have small bills or other change. This type of experience may enhance loyalty to the financial institution much more than a conventional credit or debit card. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
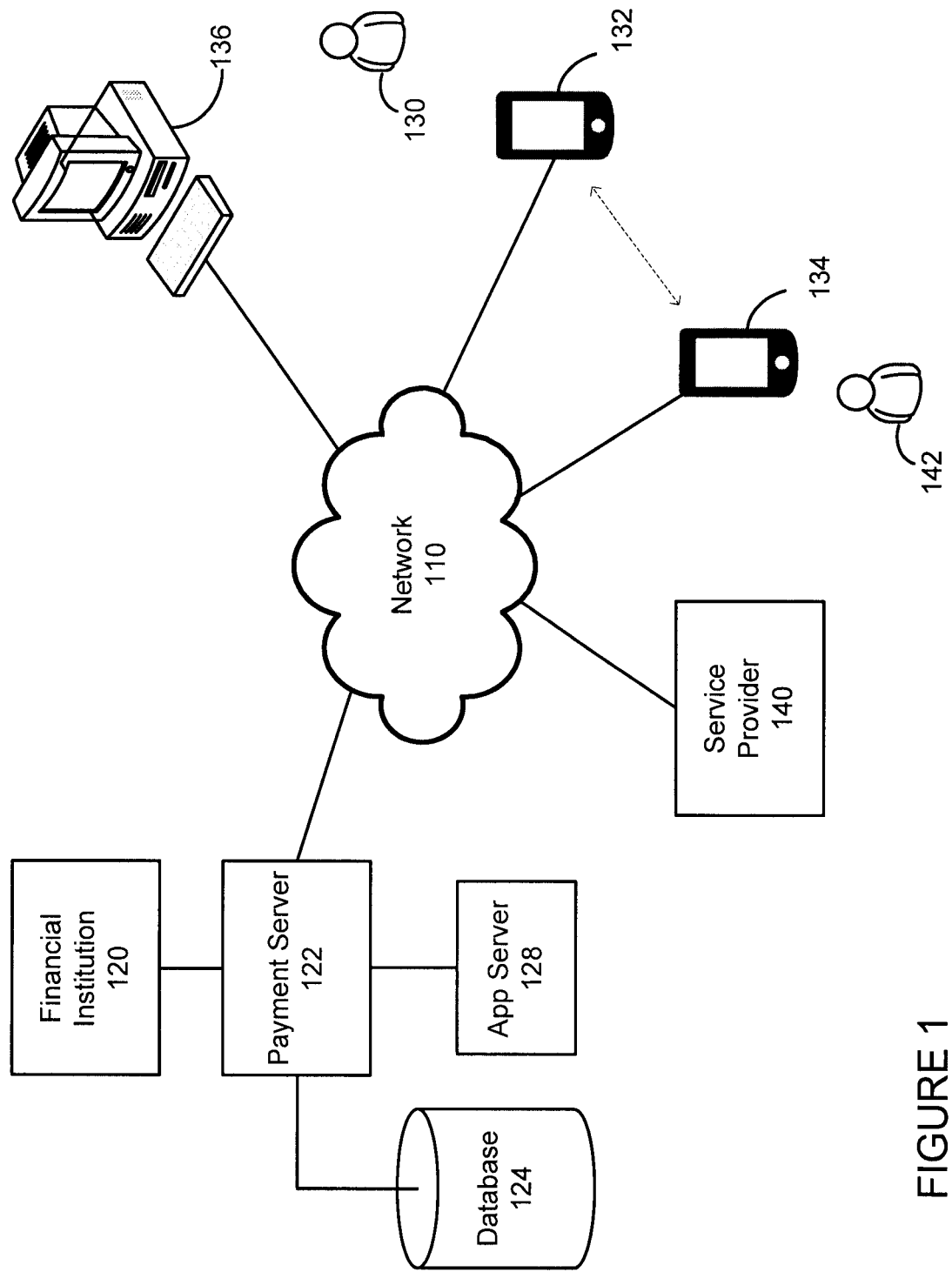
FIG. 1 is a diagram of a system for providing a digital tip to a service provider independent of an underlying transaction, according to an exemplary embodiment of the invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention enables a consumer to electronically send tips to another person (e.g., service provider, vendor, merchant, other recipient, etc.) via a mobile application. Consumers regularly use mobile devices as a payment mechanism for small and large purchases. As a result, consumers are carrying less or no cash with them and oftentimes may not have small bills or change for tipping. An embodiment of the present invention may use near field technology to detect when a consumer enters and/or leaves a proximity (e.g., geofence, boundary, etc.). Based on this detection (e.g., after the consumer leaves the geofence), an embodiment of the present invention prompts a user to provide a tip to a service provider. The customer may act on the prompt and send a tip electronically to the service provider. The service provider may respond with a simple "thank you" message to acknowledge the tip. Other forms of acknowledgement may also be transmitted. Notably, the system does not require a consumer to "friend" or seek the phone number or other identification associated with the service provider in order to send a tip. In addition, the system does not require an underlying transaction where a tip is merely added to an existing bill.

An embodiment of the present invention provides device to device communication using wireless, contactless, near field, radio and other communication technology. For example, a mobile device may use wireless technology including NFC (near field communication), BLE (bluetooth low energy) WiFi, LTE, etc.) to send a digital tip to a mobile device or other device associated with a service provider in response to an interaction detected by near proximity of a customer's mobile device to service provider's mobile or other device.

An embodiment of the present invention is directed to establishing communication using a communication channel based on close proximity with a receiving device, e.g., mobile device, wearable device, service provider device, terminal, point of sale device, etc. The communication channel may involve near field communication, low energy proximity sensing, beacons, sensors, wireless technology, etc. An embodiment of the present invention is directed to sending a digital tip by establishing connectivity with a mobile device associated with a service provider. The connectivity may be established by various technologies, including proximity sensing, wireless and/or other communication technologies. For example, a customer's mobile device may communicate with a service provider's mobile device for authentication and then enable the customer to perform a set of tipping functions. According to another example, a customer may approach a mobile device or other device of a service provider and the customer may interact with a NFC reader associated with the service provider.

According to another embodiment of the present invention, an authentication process may be performed. For example, a customer device may be authenticated as a verified customer and/or preauthorized to send digital tips. Also, the service provider's device may be authenticated as someone who is authorized to receive tips, etc. Authentication may be directed to authentication of a device to ensure that the proper device is receiving the digital tip. According to another example, in connection with the interaction, the customer may also provide a password, login, credentials, biometric and/or other form of customer authentication. Also, other forms of biometric or other methods of verifying identification may be implemented.

Current applications in the market have popularized peer-to-peer (P2P) electronic payments. An embodiment of the present invention, however, specifically targets the tipping process and is focused on quick interactions and small dollar amounts. In addition, whereas most P2P payment applications require customers to become "friends" with or know some amount of personal information about the recipient of the payment, an embodiment of the present invention facilitates sending money between two strangers who are expected to interact briefly and not repeatedly. For example, an embodiment of the present invention may proactively notify the customer when a worker who can accept digital tips is nearby so that the customer can tip them upon receiving service. An embodiment of the present invention may draw from various funding sources than existing applications because of its affiliation with a financial institution. Not only can it draw from bank accounts and credit cards, but also it can draw from a points banks of a financial institution's loyalty program. Other loyalty programs and points systems may be included. In addition, other types of currency and value may be transmitted or exchanged.

The embodiments of the present invention may also be expanded to various other scenarios in which the relationship of cash giver to cash recipient is many to one. For example, if someone is fundraising for a charity event, she could receive donations via an application of an embodiment of the present invention without having to "friend" each and every donor. According to another example, a musician performing in the subway could receive money via the application from commuters passing by who appreciate the performance.

FIG. 1 is a diagram of a system for providing a digital tip to a service provider independent of an underlying transaction, according to an exemplary embodiment of the invention. As shown in FIG. 1, the system may include one or more computer servers and networks. The system may be provided by a business or entity to provide a convenient way to tip service providers. According to one embodiment, the system may be operated and maintained by a financial institution such as retail bank using, in part, data on its retail bank customers, e.g., card holders of credit and debit cards issued by the retail bank. The system may also be maintained by a merchant, retailer, service provider, etc. In this example, a merchant who is in a service industry may make the tipping functionality available via a merchant app or other platform.

As shown in FIG. 1, a customer or user 130 may access a network 110 via various devices, including mobile device 132, computer 136 as well as other communication and processing devices, including wearables, etc. The customer may access a mobile app or other program that runs on a mobile device, computer or other processing device that enables a customer to access a digital tipping program. The tipping functionality may also be part of a banking app, merchant app, third party app, service provider app, etc.

As shown in FIG. 1, a user 130 may use a mobile device 132 to make tips to a service provider or representative, as illustrated by 142. For example, the customer may transmit a digital tip to a service provider 142, via the service provider's mobile device 134. The service provider may also receive tips via other devices, e.g., kiosk, terminal, POS device, etc. Also, the mobile device 132 may include a mobile app that enables the user to make tips and payments. For a recipient, a tipping fund may be maintained and managed by the app where funds may be transferred to another account. For example, an account may be maintained by a financial institution and may include funds as well as other forms of points, credit and/or other metric or currency. The account may be specific to one customer. Also, the account may be for a group of members where points and benefits may be shared, allocated and/or distributed to the members.

Also shown in FIG. 1 is an account holder 130 of the financial institution who may communicate electronically with a financial institution 120 using a mobile device 132 and a personal computing device 136. The mobile device 132 may communicate with another mobile device 134. The mobile device 132, 134 may be a smart phone, such as an Apple iPhone, Samsung Galaxy, or Amazon Fire Phone, that includes a touch screen or other interactive display. The mobile device 132, 134 may also include other hardware and software enabling them to communicate using other communication channels, such as a near field communication (NFC) signals or a Bluetooth signals. The mobile device 132, 134 also typically includes hardware and software to enable communication with a cellular network and WiFi network. The personal computing device 136 may comprise a laptop computer, tablet computer, or desktop computer, for example. The account holder 130 may use the personal computing device 136 to execute various online transactions with the financial institution 120 at home or elsewhere. The account holder may also manage funds data, including a tip fund, for example.

An embodiment of the present invention may be provided by various entities, such as a financial institution, service provider, merchant, etc. For example, a merchant app may be offered by a service provider, represented by Service Provider 140, or a third party service provider. The customer may also access a payment system provided by a financial institution 120 such as a retail bank, according to one embodiment of the invention. The payment system may be embodied primarily or entirely in a payment server 122 (which may include one or more databases represented by 124) owned and/or operated by the financial institution 120 that interfaces with a number of other servers and entities via one or more networks.

Payment server 122 enables user or account holder 130 to make payments by interfacing with other servers owned and/or operated by the financial institution 120 and/or other entities. The app server 128 may interface with other servers owned and/or operated by the financial institution. For example, payment server 122 may interface with a credit card server and associated database that stores and processes credit card transactions for credit card holders of the financial institution 120. Payment server 122 may also interface with a rewards program server and associated database that stores and processes rewards information for account holders at the financial institution 120. The foregoing description is merely one example of a configuration for such functions and is not intended to be limiting.

Various embodiments of the invention may also utilize an established payment network such as the VISA network, MasterCard network, NYCE network, or other similar network to transmit information between various entities using the system. For example, payment server 122 may use the VISA network for authorization and settlement of transactions. However, use of such established credit and debit networks is not required according to various embodiments of the invention. Payment Server 122 may be configured to use other networks for executing payment transactions and transmitting information to the cardholders, merchants, and financial institutions. Payments can be made by rendering such other payment network's digital tender on the mobile device 132, 134.

Referring again to FIG. 1, the network 110 enables communications between various computing devices and storage devices in the system. The network 110 may comprise one or more of the Internet, a wide area network (WAN), a local area network (LAN), and/or an intranet, according to various embodiments of the invention. The network 110 may also comprise, include, or interface to any one or more other communication channels or devices, such as a digital T1, T3, E1 or E3 line, a digital subscriber line (DSL) connection, an Ethernet connection, an integrated services digital network (ISDN) line, a WiFi connection, Bluetooth connection, a Wireless Application Protocol (WAP) link, a Global System for Mobile Communication (GSM) link, a Global Positioning System (GPS) link, a cellular digital packet data (CDPD) link, or a satellite communication channel, for example.

Having described an example of the hardware, software, and data that can be used to run the system, an example of the method and customer experience will now be described. The method will be described primarily as an example in which a customer downloads a software application (sometimes referred to as an "app") and uses it for accumulating points and/or making purchases. However, those skilled in the art will appreciate that the principles of the invention can be applied to related circumstances, such as where the entity providing the app is a business other than a merchant, or where the merchant app functionality is provided through a browser on the customer's mobile device rather than through a software application (app) downloaded to the customer's mobile device, and with purchases from various providers.

Figure 2:
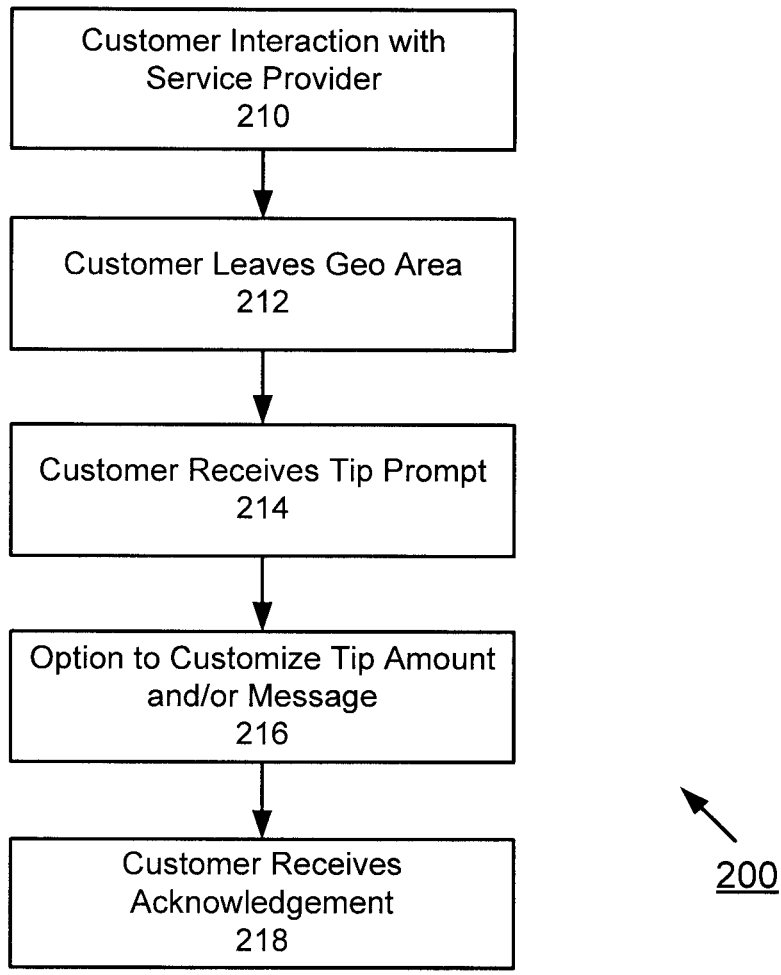
FIG. 2 is an exemplary diagram of a method for providing a digital tip to a service provider based on a geofence or other boundary, according to an embodiment of the present invention.

FIG. 2 is an exemplary diagram of a method for providing a digital tip to a service provider based on a geofence or other boundary, according to an embodiment of the present invention. At step 210, a customer may interact with a service provider. At step 212, a customer may leave or enter a geofence or other boundary. At step 214, the customer may receive a prompt to tip a service provider. At step 216, the customer may customize a tip amount and/or message. At step 218, the customer may receive an acknowledgement from the service provider. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

An embodiment of the present invention is directed to a system that electronically sends tips to another person via a mobile application on a mobile device. After a customer approaches and is serviced by a service industry worker, when the customer leaves the proximity of the worker, the customer's mobile phone may prompt the customer to deliver a tip to the worker. The customer may act on the prompt, which will send money electronically to the worker. In response, the worker may send an electronic message thanking the customer if the worker so chooses. Also, a customer may search for workers nearby and send them tips manually instead of responding to the notification-based flow.

An embodiment of the present invention may also generate proactive notifications to users of available tip recipients and also facilitate P2P payments without needing to be friends through the application. An embodiment of the present invention is directed to a user interface optimized for fast interaction and small dollar amounts. Users may also pay with loyalty points as a funding source in addition to credit card accounts, bank accounts and/or other accounts.

At step 210, a customer may interact with a service provider. For example, the customer may interact with a valet, coat check, bell hop, hotel worker, etc. The service provider may include generally anyone who interacts with the customer separate and apart from an underlying transaction with the service provider. This may also include services that are rendered well after a bill has been paid. In this instance, a tip cannot be retroactively added after a transaction has been completed. For instance, the interaction would not include a tip on a dinning bill, coffee receipt, etc.

At step 212, a customer may leave or enter a geofence or other boundary around the service provider. After the customer interacts with the service provider, the customer may be detected as leaving a geographic area surrounding or around the service provider. In this example, a service provider may have a mobile device that identifies a boundary using near field technology, for example. Accordingly, shortly after the customer leaves, the customer may be prompted to provide a tip so that the service provider will readily know who and why the tip would be given, Other mechanisms for identifying when a customer has received service may be implemented. For example, a customer may be prompted based on a time period. The customer may be identified as having completed an interaction (e.g., hotel checkout, payment of restaurant bill, etc.).

At step 214, the customer may receive a prompt to tip a service provider. Upon detection of the customer leaving a boundary around the service provider (or other identification of completion of service), the customer may receive an alert or prompt. In response, the customer may provide a tip using a mobile device, a merchant app, a third party app, via phone order and/or other forms of communication.

For example, a customer may be prompted to send a tip after a time period of 10-15 minutes, for example, after a transaction or indication of completion of service. In addition, a customer may receive a message asking about service, e.g., "were you pleased with your service today?" Upon receiving a favorable response, the system may then prompt the customer to send a tip.

At step 216, the customer may customize a tip amount and/or message. Upon receiving the prompt, the customer may enter a tip amount or confirm a suggested tip amount. An embodiment of the present invention may also recognize the type of service the customer received and then suggest an appropriate tip amount. The customer may also predetermine a single tip amount or multiple tip amounts, etc. For example, the customer may predefine a tip amount for a particular service. According to another example, the customer may predefine a schedule of tip amounts for corresponding services. Also, based on prior tips, an embodiment of the present invention may learn the customer's tip amount preferences and suggest amounts based on historical customer data.

At step 218, the customer may receive an acknowledgement from the service provider. The customer may receive a "thank you" message from service provider. Also, when the service provider receives and accepts the tip, an automatic acknowledgement may be sent to the customer for confirmation.

To protect the privacy of the customer as well as the service provider, the messages may be removed after a short time period, e.g., 10 seconds, 60 seconds, 90 seconds, or other time period, etc., after the message has been open, read or otherwise acknowledged. Accordingly, the service provider or customer could not continue to contact either party through the system.

Figure 3:
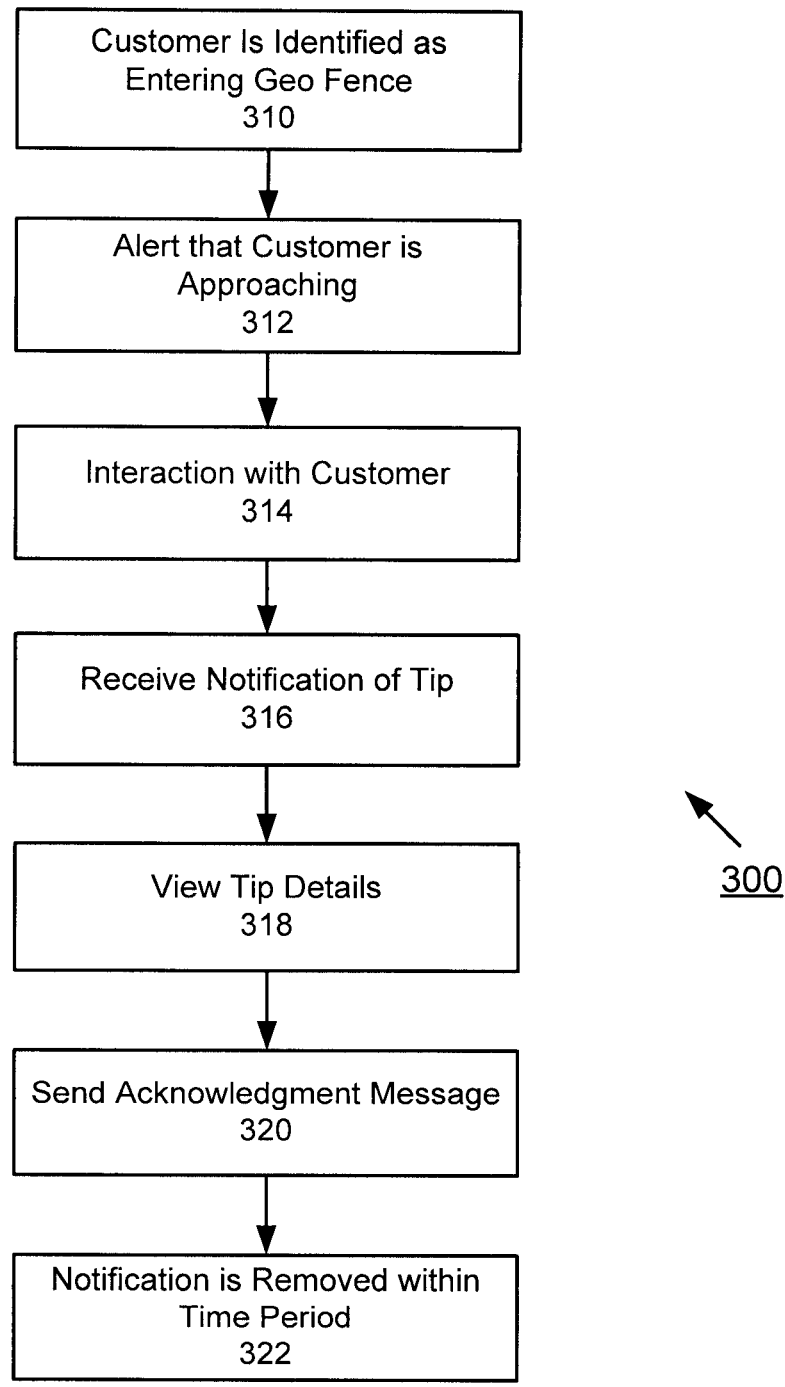
FIG. 3 is an exemplary diagram of a method for receiving a digital tip from a customer for a service based on a geofence or other boundary, according to an embodiment of the present invention.

FIG. 3 is an exemplary diagram of a method for receiving a digital tip from a customer for a service based on a geofence or other boundary, according to an embodiment of the present invention. At step 310, a customer may be identified as entering a geofence, or other boundary. At step 312, a service provider may be alerted that the customer is approaching. At step 314, the service provider and the customer may interact. At step 316, the service provider may receive a notification of a tip from the customer. At step 318, the service provider may view the tip. At step 320, the service provider may send a thank you or other acknowledgement message. At step 322, the notification may be removed within a predetermined time period. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, a customer may be identified as entering a geofence, or other boundary. The customer may be detected by the customer's mobile device geo location functionality. For example, near field technology may be used to detect and identify the customer. Other mechanisms for detecting a customer may be implemented.

At step 312, a service provider may be alerted that the customer is approaching. For example, as the customer approaches a service provider, the service provider may receive a notification. The notification may include the customer's first name (or alias, nickname, identifier, etc.) so that the service provider may address the customer by name. For some services, additional information may be provided, including information to assist the service provider as well as customer preference data. For example, if the service provider is a valet service, as the customer approaches, the customer's name may be provided as well as the customer's ticket number that identifies the customer's car. Also, instead of a ticket number, the customer's car model, color, partial license plate number, etc.

At step 314, the service provider and the customer may interact. The interaction may generally involve a service that does not require a payment including credit card or other transaction. Such services may include coat check, valet service and other service that do not directly charge the customer. Some services may include an underlying transaction but not directly with the service provider (e.g., a doorman may be paid by the building but there is no direct transaction between the doorman and the customer). Other services may be rendered well after a bill has been paid.

At step 316, the service provider may receive a notification of a tip from the customer. The notification may inform the service provider that a tip was given by a customer. The customer may be notified by a first name, alias, image, picture, and/or other identifier.

At step 318, the service provider may view the tip. The tip amount may be displayed on the service provider's mobile device. Other information about the tip and/or the customer may be provided.

The tip amount may be added to a fund. For example, the service provider may manage a fund where the tip amount may be added. The service provider may also directly transmit or later transfer funds to an account with a financial institution, merchant, etc. The funds may also be directly transferred as credit associated with a particular merchant or other entity. For example, a service provider may receive $2 store credit for each dollar transferred into a particular account. Such deals and offers may be provided by affiliate and/or partner merchants. Other variations may be implemented.

At step 320, the service provider may send a thank you or other acknowledgement message. In addition, customized suggestions may be provided to the customer. For example, when a doorman is tipped by the customer, a hotel chain may provide an offer, incentive, promotions, etc. Other content may be provided as well. Also, a parent company associated with the service provider may provide a coupon, incentive or other offer as a thank you to the customer for tipping a service provider. The incentive may be provided with the acknowledgement as well as a later follow-up (e.g., subsequent email offer if the customer opts in to receiving targeted content, etc.). The offers may be customized and targeted to a specific customer. The parent company may also view tipping history for a particular customer as well as service provider.

At step 322, the notification may be removed within a predetermined time period. In some instances, a customer may favor a particular service provider, e.g., favorite doorman, valet, etc. For such service providers, the notification may be stored and included in a favorites list. The customer may then use that list to provide additional tips, e.g., Holiday Tip, etc. Other service providers may warrant a periodic tip that may be scheduled by the customer. For example, a customer may hire a law service company where the customer may desire to tip a particular gardener independently of the lawn service fee.

Figure 4:
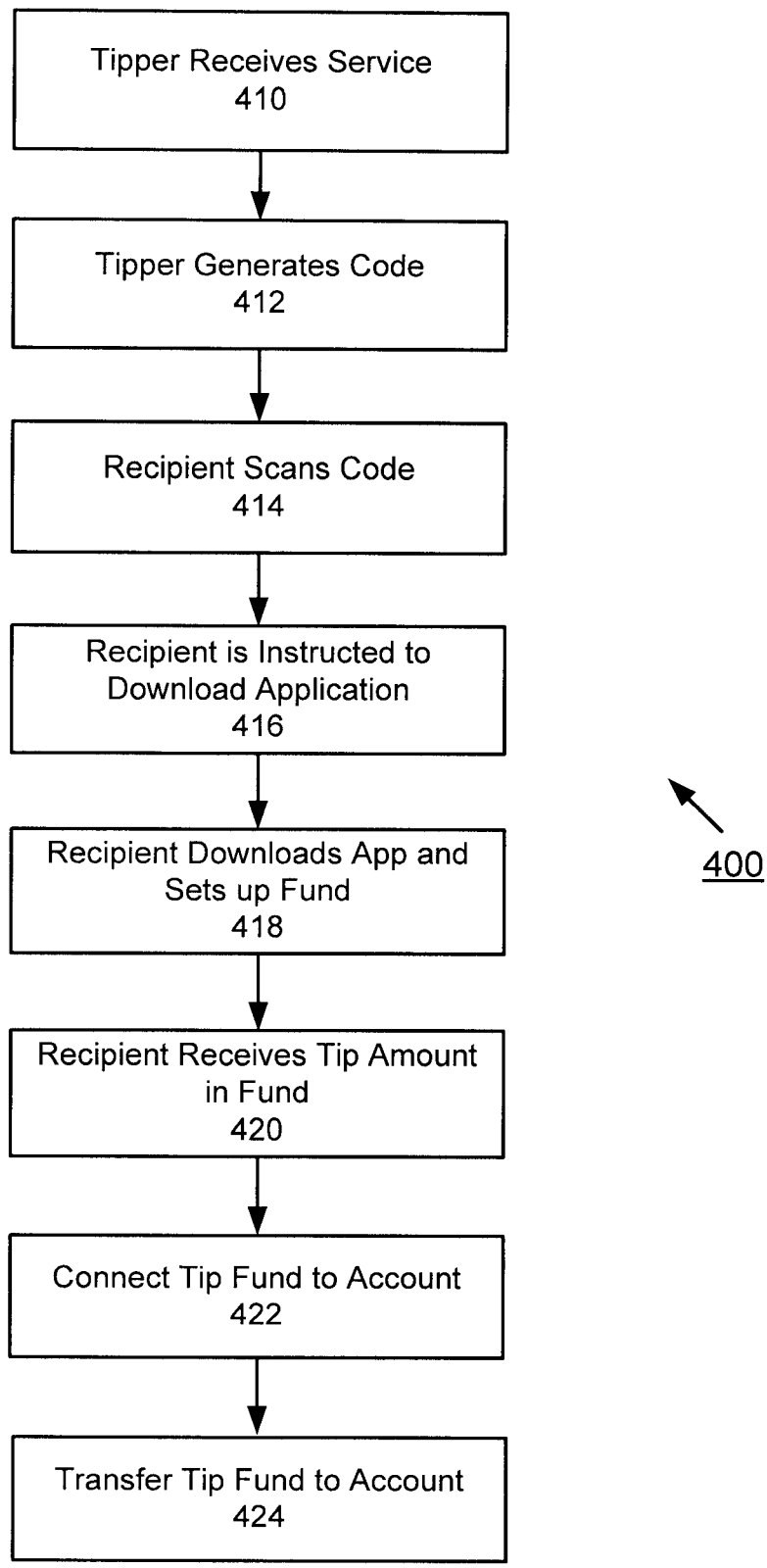
FIG. 4 is an exemplary diagram of a method for providing a tip when a service provider does not have a tipping app, according to an embodiment of the present invention.

FIG. 4 is an exemplary diagram of a method for providing a tip when a service provider does not have a tipping app, according to an embodiment of the present invention. At step 410, a tipper may receive a service. At step 412, the tipper may generate a code. At step 414, the service provider may receive and/or scan the code. At step 416, the service provider may be directed to download a mobile device app. At step 418, the service provider may download the mobile device app or other application. At step 420, the service provider may receive the tip amount into a tip fund. At step 422, the service provider may connect the tip fund to an account. At step 424, the service provider may then transfer the fund amount to a bank or other account. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

An embodiment of the present invention is directed to a scenario when the service provider does not have a mobile application that provides tipping functionality. In this case, the tipper may generate a code and send the code to the service provider who can then download the mobile application. Other variations may be realized and implemented.

At step 410, a tipper may receive a service. As discussed above, the service may include any service that does not require an underlying transaction with a service provider.

Figures 5, 6:
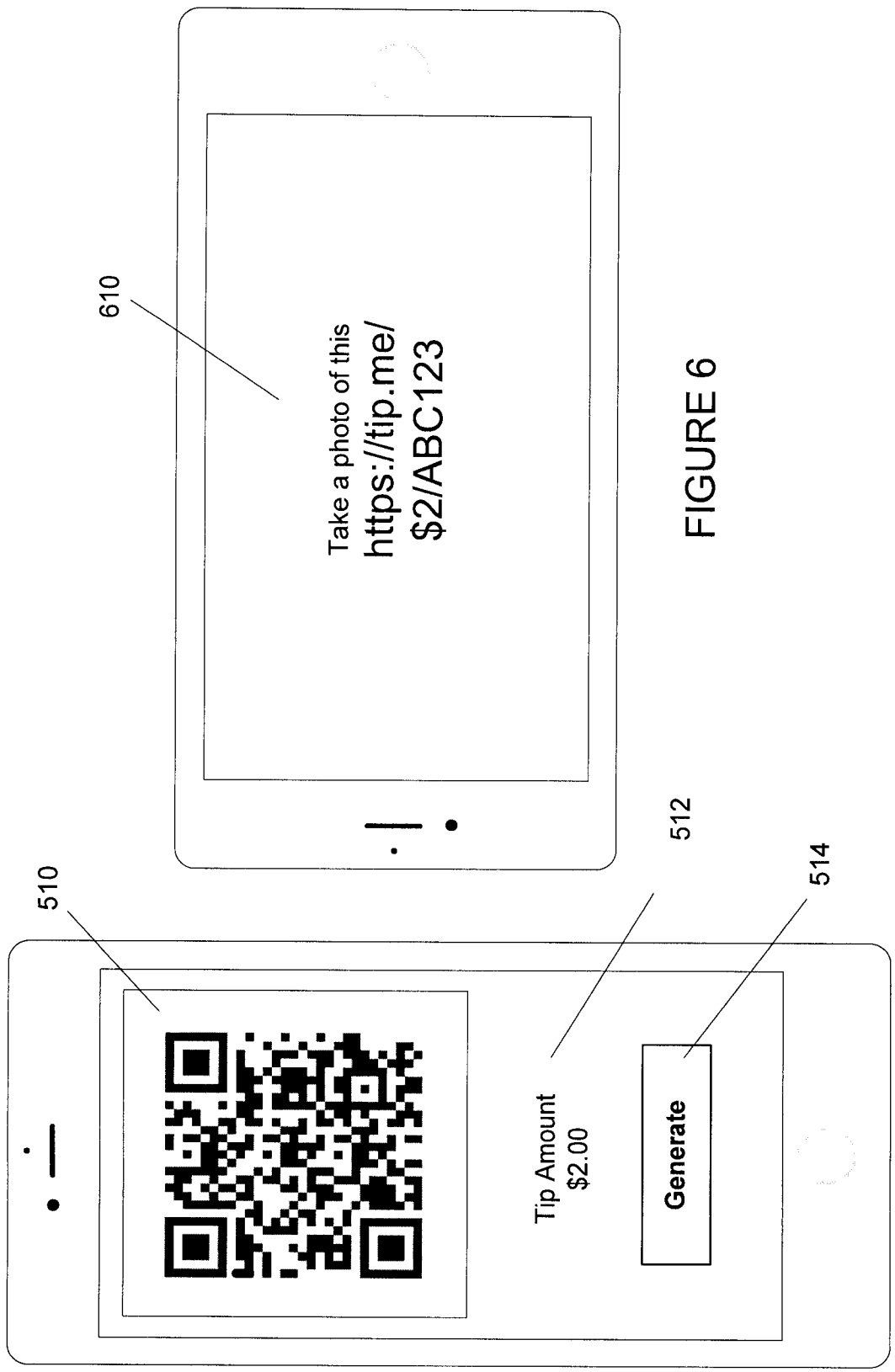
FIG. 5 is an exemplary screen shot illustrating a tip code, according to an embodiment of the present invention.
FIG. 6 is an exemplary screen shot illustrating a tip code, according to an embodiment of the present invention.

At step 412, the tipper may generate a code. If a recipient does not have a tipping application, the tipper may generate a code to send a digital tip. FIG. 5 is an exemplary screen shot illustrating a tip code, according to an embodiment of the present invention. As shown in FIG. 5, a code may be displayed at 510. The code may include a Quick Response (QR) code, barcode, machine-readable optical label, images, for example. FIG. 5 also displays a tip amount at 512 and a Generate function 514 that generates a digital tip. FIG. 6 is an exemplary screen shot illustrating another tip code, according to an embodiment of the present invention. In this example, a tip code link may be display at 610. The link itself may indicate the amount of the tip. In this example, the link indicates that the tip amount is $2. Other variations of codes may be implemented, including other images, links, etc.

At step 414, the service provider may receive and/or scan the code. For example, the service provider may take a picture or otherwise access the code. Other methods for accessing the code may be used.

At step 416, the service provider may be directed to download a mobile device app. The service provider may be directed to an application store on a mobile or other device.

At step 418, the service provider may download the mobile device app or other application. According to another embodiment, the tip functionality may be provided by other sources, such as a merchant app, bank app, third party app, etc. For example, the tip functionality may be part of another app, e.g., hotel app, restaurant app, merchant app, etc. In this example, a hotel chain may enable a tipping widget for the customer (who may already have the hotel app downloaded) to facilitate tipping to hotel staff. Other variations may be implemented.

Figure 7:
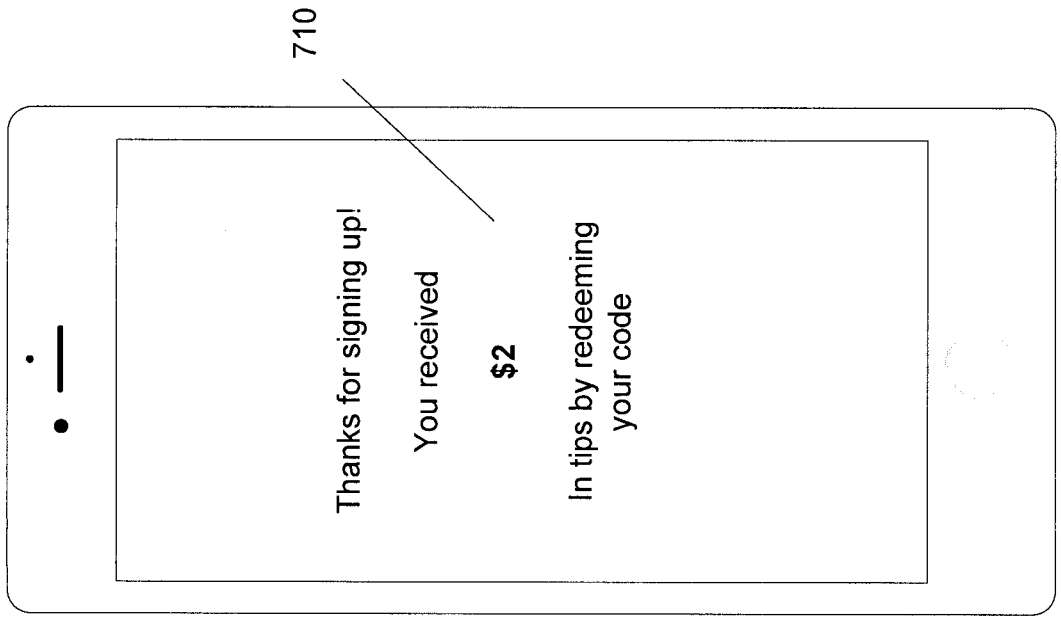
FIG. 7 is an exemplary screen shot illustrating a tip recipient screen, according to an embodiment of the present invention.

At step 420, the service provider may receive the tip amount in a tip fund or other account or receiving account. FIG. 7 is an exemplary screen shot illustrating a tip recipient screen, according to an embodiment of the present invention. As shown in FIG. 7, the service provider is informed that a tip has been received, at 710. The recipient may then receive the tip by redeeming the code shown in FIGS. 5 and 6.

At step 422, the service provider may connect the tip fund to an account. The tip fund may be connected to an account at a bank, financial institution, such as a debit account, credit account, etc. The account may also include a stored value account, merchant specific account, private label account. The service provider may also contribute to a group account, as well as associate the tip fund to multiple accounts. For example, service providers may pool their tips into a single account for later distribution. Other variations may be realized.

Figure 8:
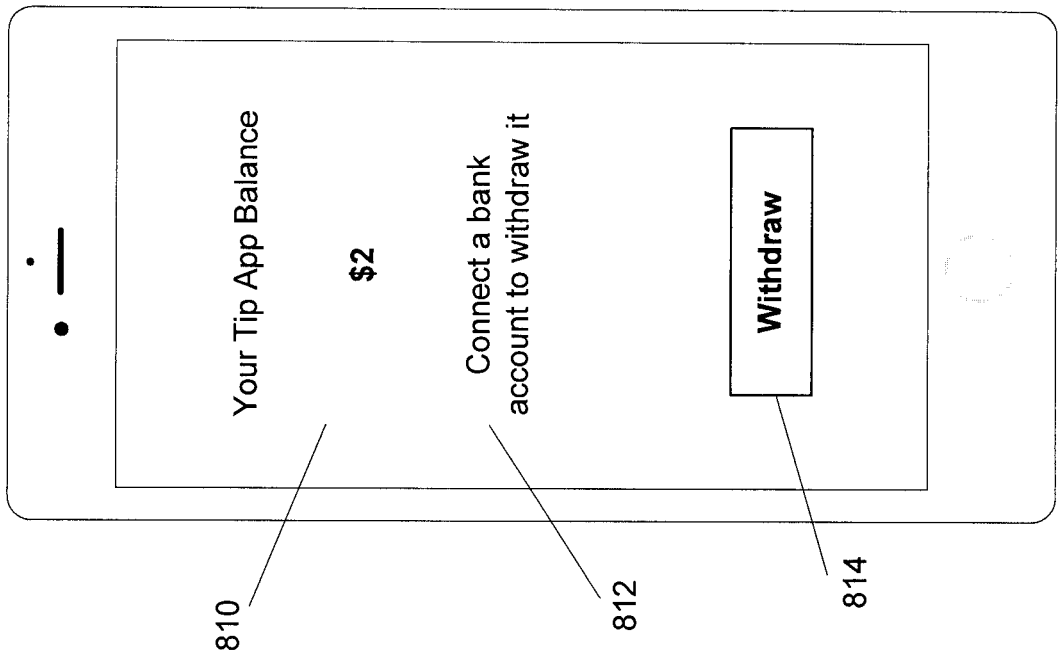
FIG. 8 is an exemplary screen shot illustrating a connection to a bank account, according to an embodiment of the present invention.

At step 424, the service provider may then transfer the fund amount to a bank or other account. FIG. 8 is an exemplary screen shot illustrating a connection to a bank account, according to an embodiment of the present invention. As shown in FIG. 8, the tip balance is shown by 810 and the recipient may connect the tip balance to an account as shown by 812. The recipient may then withdraw the funds, by selecting 814.

Figure 9:
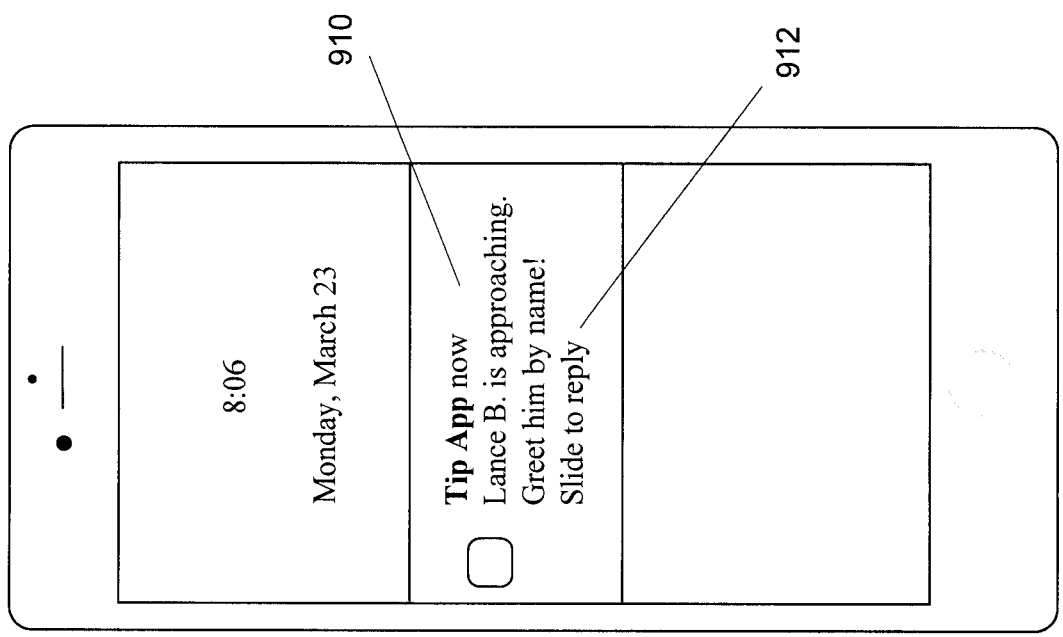
FIG. 9 is an exemplary screen shot illustrating a tip screen, according to an embodiment of the present invention.

FIG. 9 is an exemplary screen shot illustrating a tip screen, according to an embodiment of the present invention. A service provider may be notified that a customer is approaching by a message illustrated at 910. The service provider may then slide at 912 to reply.

Figure 10:
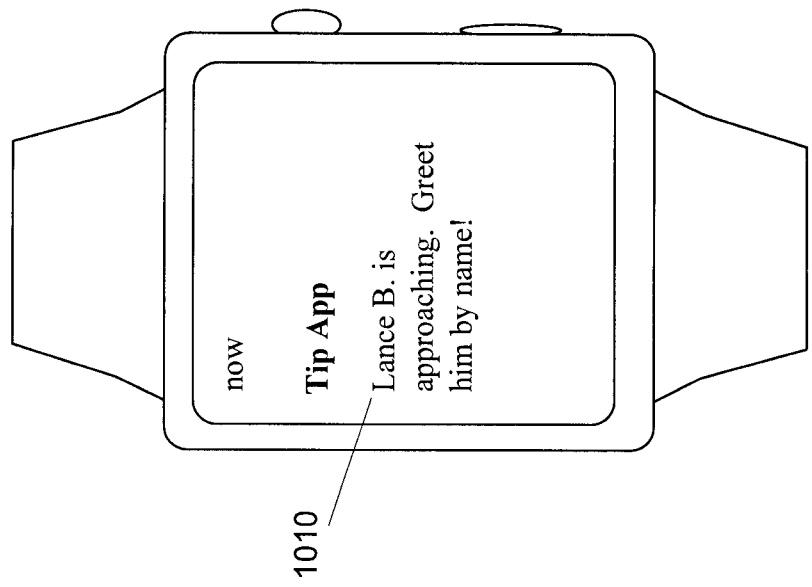
FIG. 10 is an exemplary screen shot illustrating a tip screen, according to an embodiment of the present invention.

FIG. 10 is an exemplary screen shot illustrating a tip screen, according to an embodiment of the present invention. FIG. 10 illustrates another variation where a service provider may be notified by a wearable or other mobile device, as shown by 1010. There may be instances where a service provider uses a kiosk, terminal and/or other stand-alone device. The service provider may receive notification on such devices as well.

Figure 11:
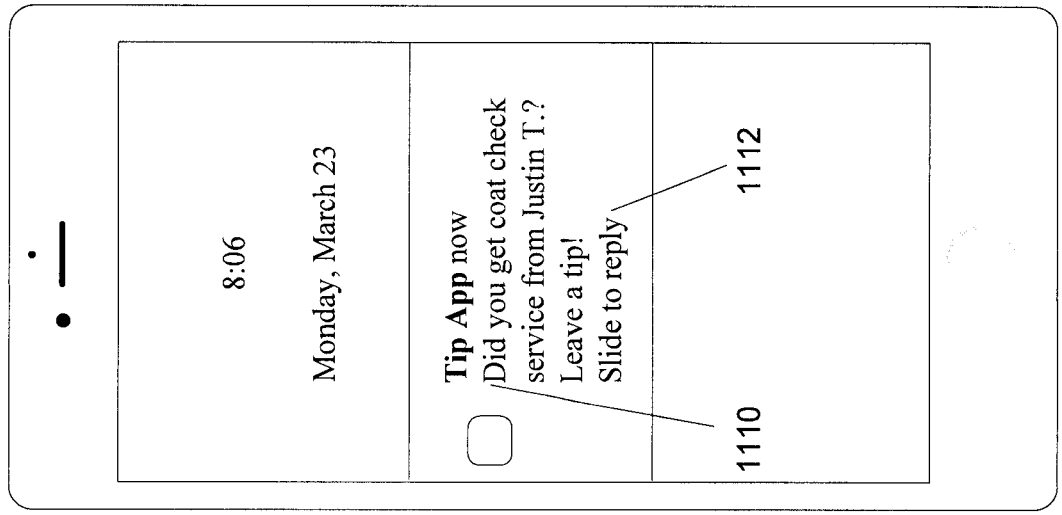
FIG. 11 is an exemplary screen shot illustrating a tip app screen, according to an embodiment of the present invention.

FIG. 11 is an exemplary screen shot illustrating a tip app screen, according to an embodiment of the present invention. After a customer receives service, the customer may be prompted to provide a tip. An embodiment of the present invention may detect that a customer has received a service in various ways, including geolocation, confirmation of services rendered from a service provider, time limit or timing (e.g., end of services rendered), etc. The customer may be detected as leaving a geofence or other location around a service provider. Also, the service provider may indicate that service has been rendered thereby prompting a tip notification. In addition, a customer may be prompted based on timing or time period. In this scenario, a valet at a theater may prompt a customer for a tip after a time period from when a show is over (e.g., 30 minutes after a show has ended and the customer has likely received his car from a valet). Also, the customer may be detected when the customer's car leaves a geofence around the theater or other indication (e.g., leaving a front gate or exit area, valet driveway, etc.). As shown in FIG. 11, a customer be notified of services rendered by a personal message at 1110. The customer may engage the mobile app to provide a tip, as shown by 1112.

Figure 12:
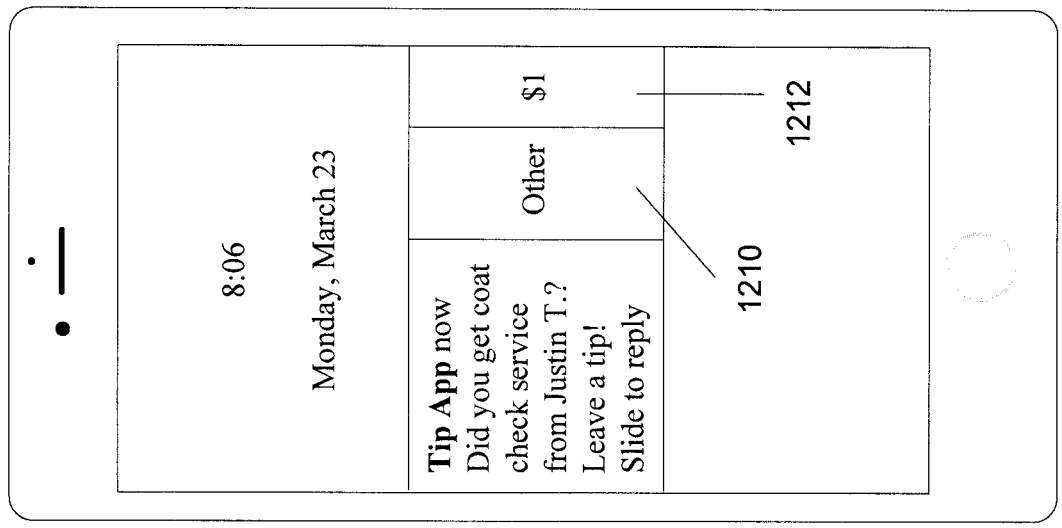
FIG. 12 is an exemplary screen shot illustrating a tip app screen, according to an embodiment of the present invention.

FIG. 12 is an exemplary screen shot illustrating a tip app screen, according to an embodiment of the present invention. By engaging the mobile app, the customer may leave a tip of a predetermined amount at 1212 or a customized amount at 1210. The tip amount may be predetermined by the customer, customized based on past customer tipping behavior and/or based on the type or price of services rendered. Other ways for determining a tip amount may be implemented.

Figure 13:
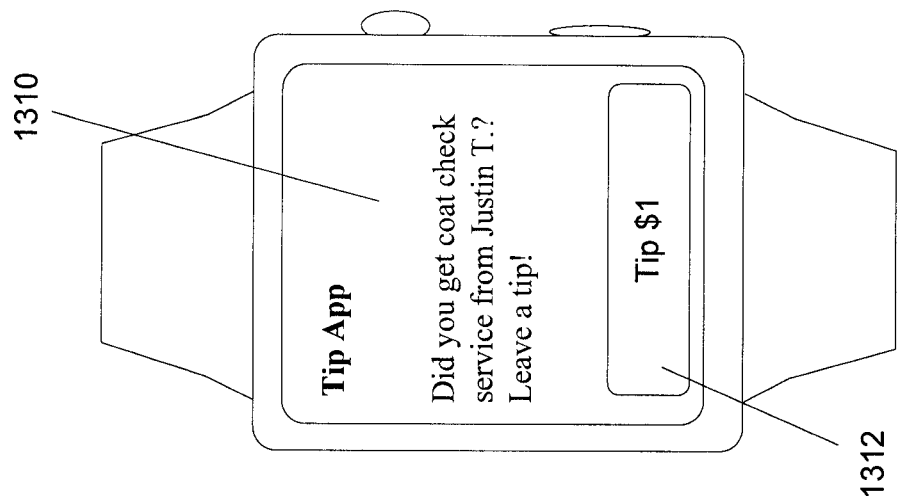
FIG. 13 is an exemplary screen shot illustrating a tip app screen, according to an embodiment of the present invention.

FIG. 13 is an exemplary screen shot illustrating a tip app screen, according to an embodiment of the present invention. FIG. 13 illustrates an exemplary screen on a wearable device. As shown in FIG. 13, a personal message may be displayed 1310 and an option to provide a tip at 1312.

Figure 14:
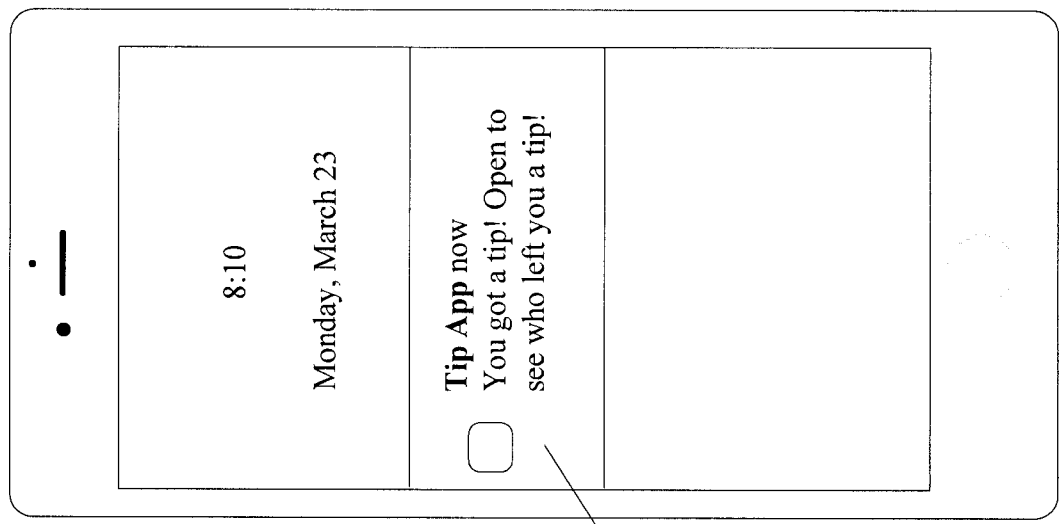
FIG. 14 is an exemplary screen shot illustrating a tip recipient screen, according to an embodiment of the present invention.

FIG. 14 is an exemplary screen shot illustrating a tip recipient screen, according to an embodiment of the present invention. FIG. 14 illustrates an exemplary screen displayed for a service provider. The message indicates that the service provider received a tip, as shown by 1410.

Figure 15:
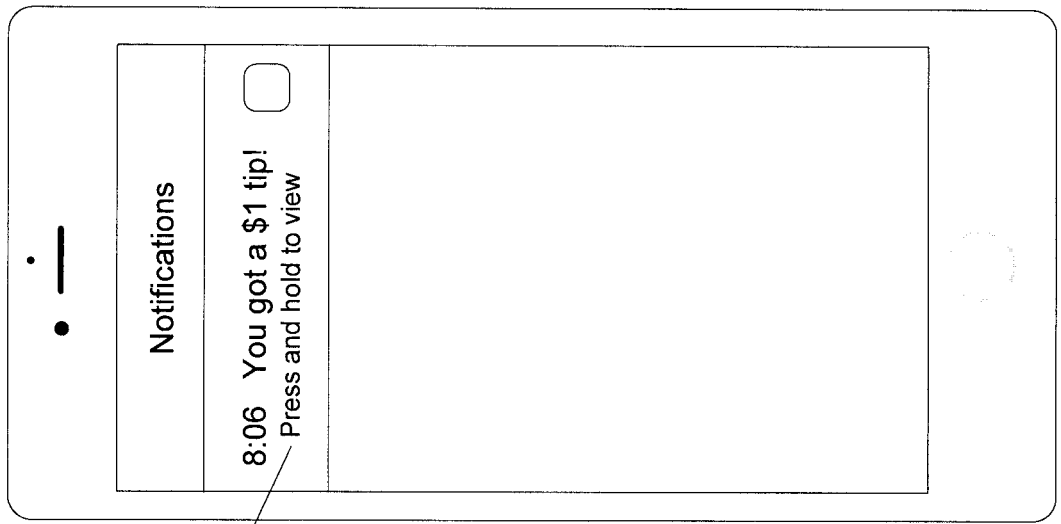
FIG. 15 is an exemplary screen shot illustrating a tip recipient screen, according to an embodiment of the present invention.

FIG. 15 is an exemplary screen shot illustrating a tip recipient screen, according to an embodiment of the present invention. As shown in FIG. 15, a service provider may view details of a tip received. In this example, the service provider has received a $1.00 at 1510.

Figure 16:
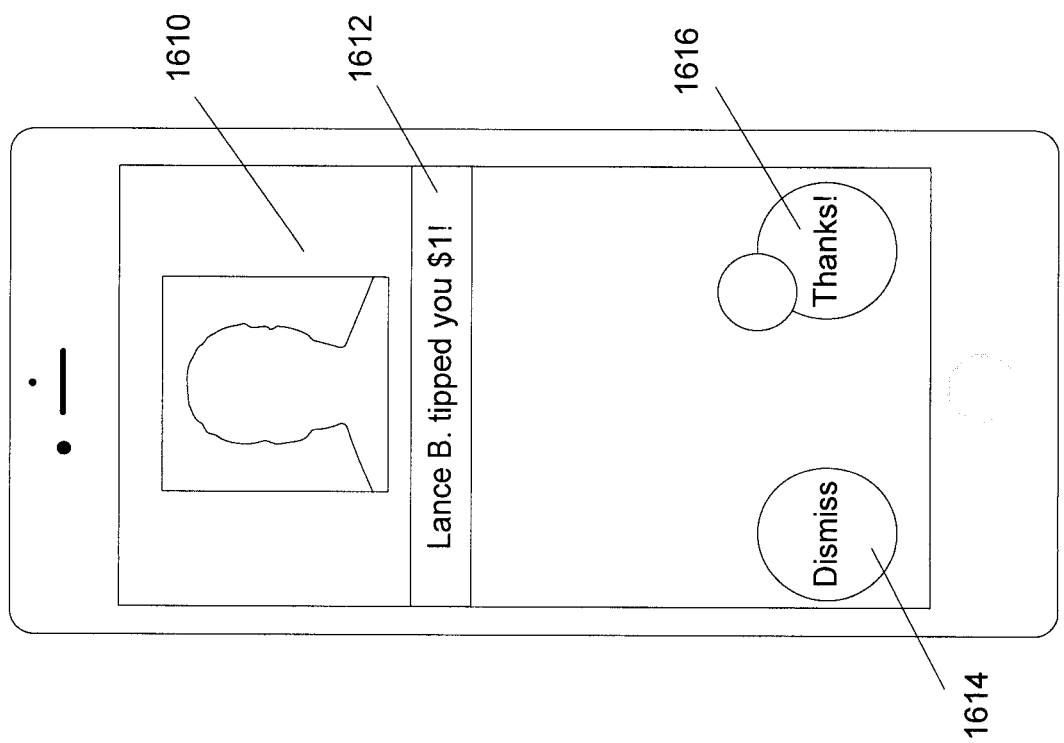
FIG. 16 is an exemplary screen shot illustrating a tip recipient screen, according to an embodiment of the present invention.

FIG. 16 is an exemplary screen shot illustrating a tip recipient screen, according to an embodiment of the present invention. Additional details of the tipper and the tip may be shown. An image of the tipper may be displayed at 1610, along with a message shown at 1612. The service provider may dismiss the message at 1614. The service provider may also send a thank you message or other acknowledgement at 1616.

Figure 17:
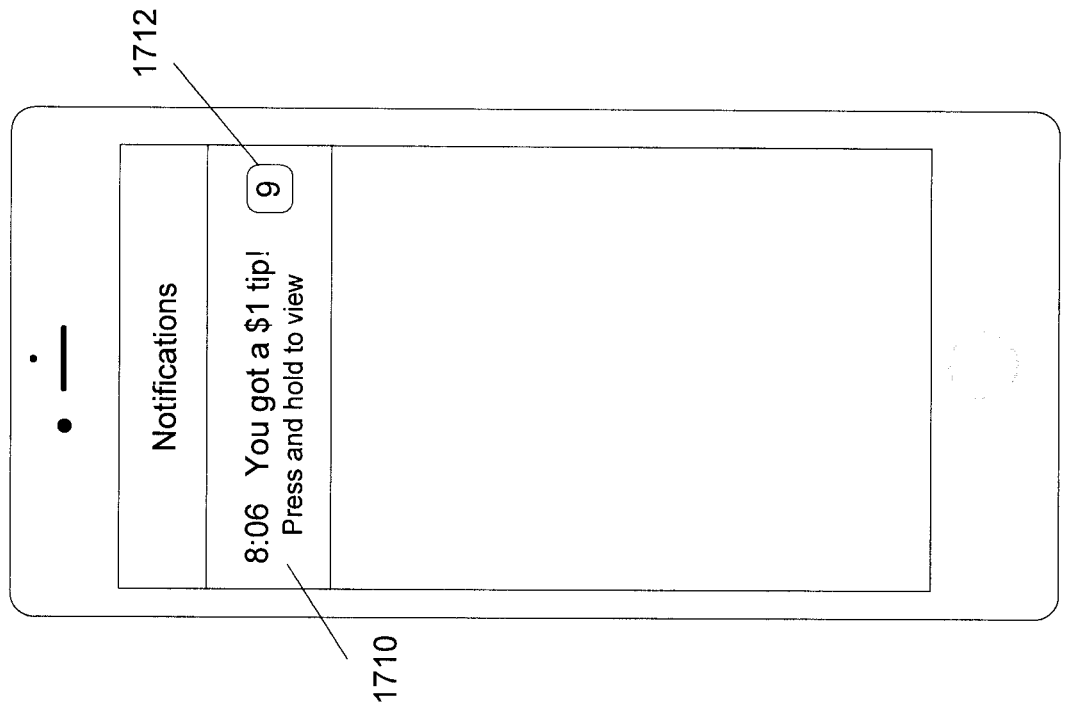
FIG. 17 is an exemplary screen shot illustrating a tip recipient screen, according to an embodiment of the present invention.

FIG. 17 is an exemplary screen shot illustrating a tip recipient screen, according to an embodiment of the present invention. After the service provider has viewed the tip message, the tip message 1710 may be automatically deleted after a short time period, as shown by 1712. In this example, the message is available for viewing for 10 seconds. Other time periods may be implemented.

Figure 18:
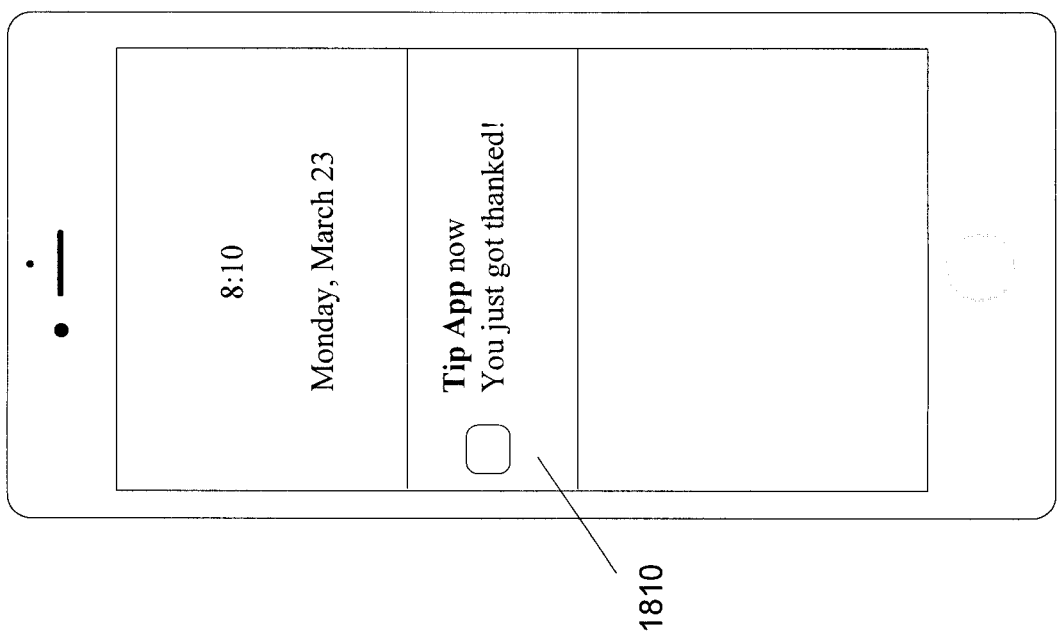
FIG. 18 is an exemplary screen shot illustrating a tip sender screen, according to an embodiment of the present invention.

FIG. 18 is an exemplary screen shot illustrating a tip sender screen, according to an embodiment of the present invention. As shown in FIG. 18, a customer may receive an acknowledgement. In this example, the customer has received a notification at 1810.

Figure 19:
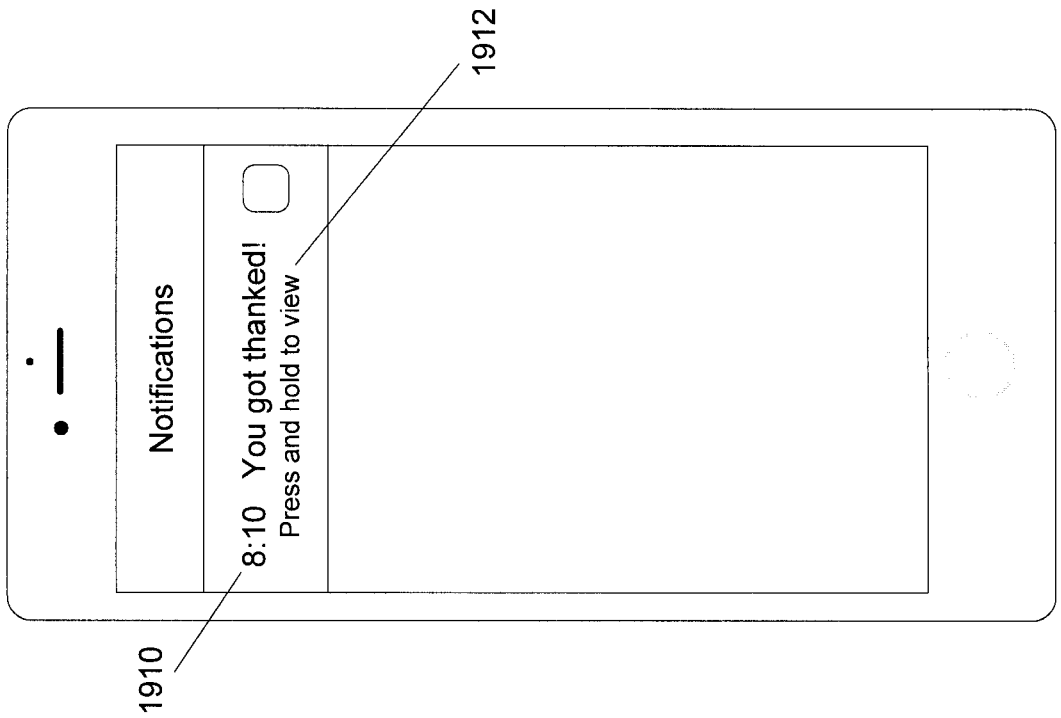
FIG. 19 is an exemplary screen shot illustrating a tip sender screen, according to an embodiment of the present invention.

FIG. 19 is an exemplary screen shot illustrating a tip sender screen, according to an embodiment of the present invention. In this example, a customer may view a thank you message at 1910. The customer may take an action at 1912 to view in more detail.

Figure 20:
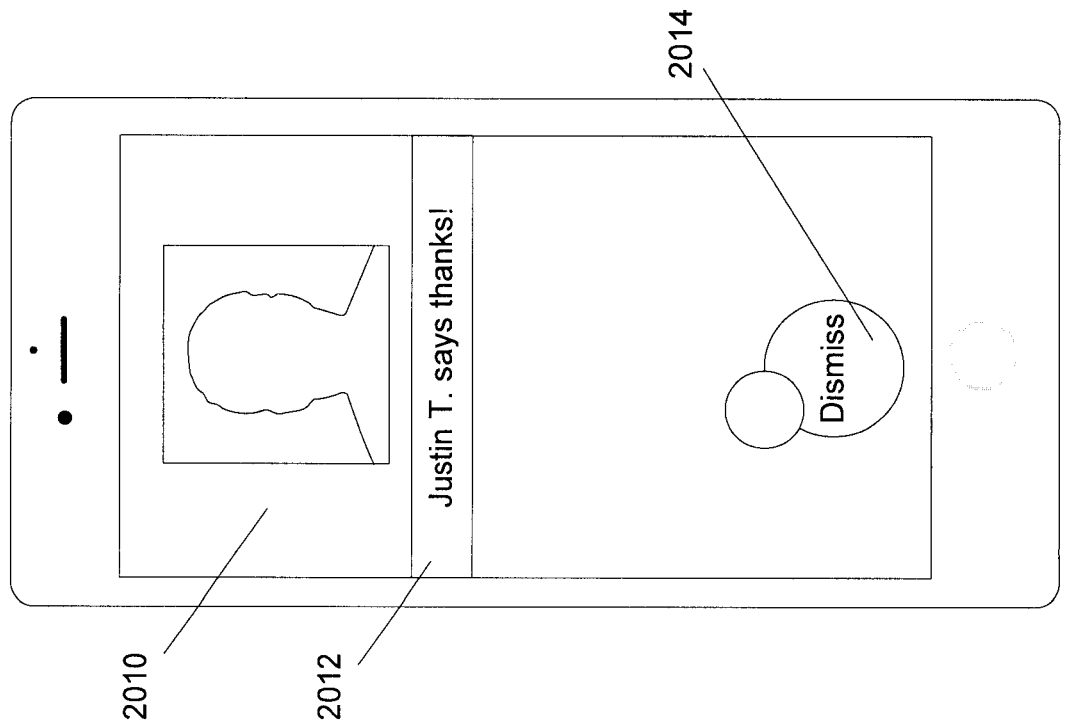
FIG. 20 is an exemplary screen shot illustrating a tip sender screen, according to an embodiment of the present invention.

FIG. 20 is an exemplary screen shot illustrating a tip sender screen, according to an embodiment of the present invention. Additional details of the service provider may be shown. An image of the service provider may be displayed at 2010, along with a message shown at 2012. The service provider may dismiss the message at 2014. According to another example, additional incentives, coupons, targeted deals may be sent to the customer as a form of appreciation.

Figure 21:
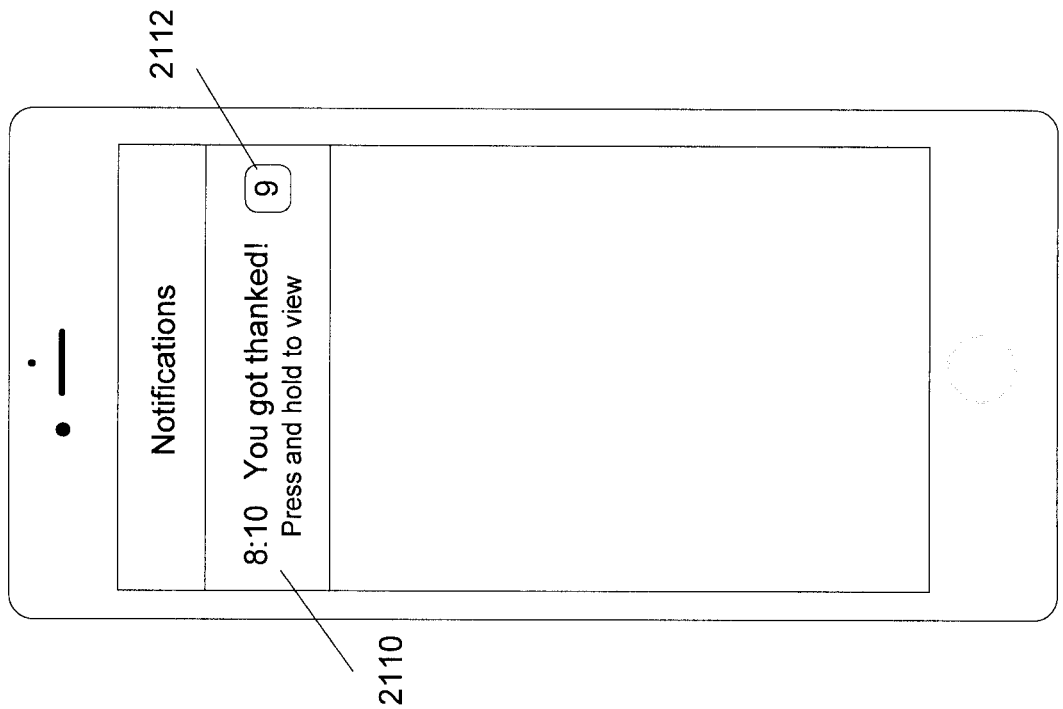
FIG. 21 is an exemplary screen shot illustrating a tip sender screen, according to an embodiment of the present invention.

FIG. 21 is an exemplary screen shot illustrating a tip sender screen, according to an embodiment of the present invention. After the customer has viewed the message, the message 2110 may be deleted after a short time period, as shown by 2112. In this example, the message is available for viewing for 10 seconds. Other time periods may be implemented.

Although the foregoing description has focused primarily on a financial institution assembling relevant data sets, processing the data, and sending the relevant data at appropriate times to its customer, the system may be operated and maintained by other types of commercial entities who may configure the system to provide similar advantages to their customers. In additional, while the foregoing description has focused primarily on the customer spend, the principles of the invention can be applied to other vendors and entities where the operating entity can assemble and provide relevant, timely information to enhance the customer's experience.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of a mobile device 132, 134 and a personal computing device 136 are shown in FIG. 1, exemplary embodiments of the invention may utilize other types of communication devices whereby a user may interact with a network that transmits and delivers data and information used by the various systems and methods described herein. The mobile device and personal computing device may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The mobile device 132, 134 and personal computing device 136 may include various connections such as a cell phone connection, WiFi connection, Bluetooth connection, satellite network connection, and/or near field communication (NFC) connection, for example.

As described above, FIG. 1 includes a number of servers 122, 128 and user communication devices 132, 134, 136, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 132, 134 or personal computing device 136. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A mobile device that enables a user to send a digital tip to a recipient as a standalone transaction, the mobile device comprising:
    a memory that stores data associated with an account and a user;
    a processor, executing a mobile application, the processor coupled to memory and programmed to:
    detect a geofence, the boundaries of which, are created based on a service provider's mobile device;
    identify whether the mobile device of the user is near the service provider's mobile device based on the mobile device of the user crossing the geofence;
    display a prompt on the mobile device of the user to send a tip to the service provider's mobile device, directly responsive to the user's mobile device leaving the geofence associated with the service provider's mobile device and further in response to a prior service interaction where the service provider is a person who provides a service to the user and where the prior service interaction is not directly related to any prior underlying monetary transaction;
    identify a tip amount for the tip;
    transmit, via a first wireless communication network, a tip message to the service provider's mobile device informing the service provider of the tip; and
    debit, via a second network, the tip amount from an account associated with the user.

2. The user's mobile device of claim 1, wherein the prompt comprises an identifier associated with the user.

3. The user's mobile device of claim 1, wherein the tip message from the user is automatically deleted after a predetermined time period of 10 to 60 seconds.

4. The user's mobile device of claim 1, wherein the prior service interaction comprises a service that does not include a monetary transaction.

5. The user's mobile device of claim 1, wherein the geofence comprises a boundary around a service provider.

6. The user's mobile device of claim 1, wherein an electronic acknowledgement is received from the service provider.

7. The user's mobile device of claim 6, wherein the electronic acknowledgement comprises a thank you message from the service provider.

8. The user's mobile device of claim 1, wherein the amount of the tip is predetermined.

9. The user's mobile device of claim 1, wherein the amount of the tip is user defined.

10. A non-transitory computer readable medium containing program instructions for enabling a user to send a digital tip to a recipient as a standalone transaction, wherein execution of the program instructions by one or more processors of a computer system causes the one or more processors to carry out the steps of:
    detect a geofence, the boundaries of which, are created based on a service provider's mobile device;
    identify whether a mobile device of the user is near the service provider's mobile device based on the mobile device of the user crossing on the geofence;
    display a prompt on the mobile device of the user to send a tip to the service provider's mobile device, directly responsive to the user's mobile device leaving the geofence associated with the service provider's mobile device and further in response to a prior service interaction where the service provider is a person who provides a service to the user and where the prior service interaction is not directly related to any prior underlying monetary transaction;

identify a tip amount for the tip;

transmit, via a first wireless communication network, a tip message to the service provider's mobile device informing the service provider of the tip; and debit, via a second network, the tip amount from an account associated with the user.

11. The non-transitory computer readable medium device of claim 10, wherein the prompt comprises an identifier associated with the user.

12. The non-transitory computer readable medium of claim 10, wherein the tip message from the user is automatically deleted after a predetermined time period of 10 to 60 seconds.

13. The non-transitory computer readable medium of claim 10, wherein the prior service interaction comprises a service that does not include a monetary transaction.

14. The non-transitory computer readable medium of claim 10, wherein the geofence comprises a boundary around a service provider.

15. The non-transitory computer readable medium of claim 10, wherein an electronic acknowledgement is received from the service provider.

16. The non-transitory computer readable medium of claim 15, wherein the electronic acknowledgement comprises a thank you message from the service provider.

17. The non-transitory computer readable medium of claim 10, wherein the amount of the tip is predetermined.

18. The non-transitory computer readable medium of claim 10, wherein the amount of the tip is user defined.

* * * * *